Figure 1:
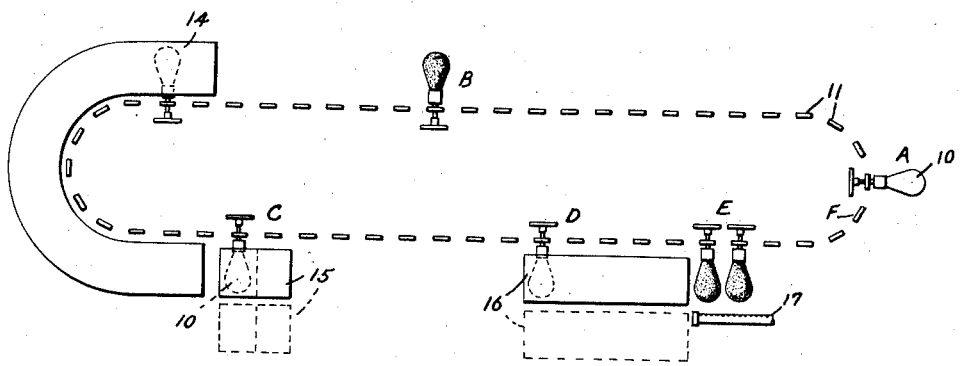

June 5, 1928.

H. D. BLAKE ET AL 1,672,857

COATING FOR GLASS SURFACES

Filed Feb. 27, 1922

INVENTORS:
HAROLD D. BLAKE,
JOSEPH E. STONE,
BY Albert G. Davis
THEIR ATTORNEY.

Patented June 5, 1928.

1,672,857

UNITED STATES PATENT OFFICE.

HAROLD D. BLAKE, OF CLEVELAND HEIGHTS, AND JOSEPH E. STONE, OF CLEVELAND, OHIO, ASSIGNORS TO GENERAL ELECTRIC COMPANY, A CORPORATION OF NEW YORK.

COATING FOR GLASS SURFACES.

Application filed February 27, 1922. Serial No. 539,505.

Our invention relates to processes for coating glass surfaces and to articles produced thereby. More particularly our invention relates to processes for coating glass surfaces which in use are subjected to heat, and has particular application to a coating for incandescent electric lamps.

The objects of our invention are to produce a coating which will adhere to the glass surface, which will stand heat without discoloration, and which will also resist the action of water, hot or cold. One of the principal advantages of our invention is that it furnishes an acceptable substitute for sand blasting, which is very objectionable from a sanitary standpoint.

Our invention from one standpoint comprises the application to a glass surface, such as that of the bulb of an incandescent lamp, of a coating comprising kaolin or china clay in a colloidal state. This colloidal state may be produced by the use of a binder consisting of an alkaline silicate such as commercial sodium silicate which ordinarily contains a certain amount of free alkali, or a purer sodium silicate low in free alkali may be used, and a certain amount of alkali such as caustic soda added to the solution. When such a coating is applied as by spraying upon the glass surface and allowed to dry, it produces a very effective coating.

Our invention, from another standpoint, comprises the application to the glass surface of a mineral body material mixed with an inorganic binder such as sodium silicate, and the subsequent fixing of said coating by a suitable bath. Materials which have been found to serve well as body materials are French chalk or talc and china clay or kaolin. These may be used alone or with coloring materials such as zinc oxide (Zn O) which produces a desirable white. When a thin coating of this kind is applied a very satisfactory substitute for the frosted lamp is obtained. Heretofore it has been found necessary when such materials have been used for coatings to apply some sort of a protecting or retaining material such as a varnish. This has been more or less objectionable on account of flaking off of the varnish, and also on account of its low resistance to heat. We have found that by fixing the aforesaid coating by subjecting it to the action of materials such as the halogen compounds particularly fluorides and chlorides a very tenacious coating is obtained which is resistant to heat and also resists the action of hot or cold water. Another characteristic of such a coating is that it does not bloom. Such blooming is a discoloration and swelling of the coating probably caused by combination of the coating materials with carbon dioxide or other constituents of the atmosphere. The fixing of our invention probably results from a removal of free alkali from the coating. Additional features and advantages of our invention will appear from the more detailed description thereof which follows.

One mixture which we have used is:

French chalk _____ 500 grams.
Zinc oxide _____ 500 grams.
Sodium silicate (sp. g. 1.375) __ 1000 cc.'s.
Water _____ 800 cc.'s.

The French chalk and zinc oxides are first mixed thoroughly and placed in a ball mill. The sodium silicate solution is then added and the mixture is ball milled, preferably, from 18 to 24 hours.

Another mixture which we have used to produce an appearance similar to that produced by sand blasting comprises:

20 grams white china clay or kaolin, 160 cc.'s water, 220 cc.'s sodium silicate (sp. g. 1.375). This is ball milled for 14 hours.

Still another mixture is:

White china clay _____ 750 grams.
Sodium silicate (sp. g. 1.375)
  (low in $Na_2O$) _____ 1900 cc.'s.
Caustic soda _____ 65 grams.

We prefer to dry a coating produced by the application of one of the above mixtures for about three minutes at approximately 150° C. after which the coating is fixed, by applying a suitable solution. Such a solution may consist of a saturated solution of sodium bi-fluoride. Another solution which may be used is as follows:

Ammonium chloride crystals ___ 100 grams.
Sulphuric acid (C. P. sp. g.
  1.84) _____ 100 cc.'s.
Distilled water _____ 900 cc.'s.

Still another solution which may be used consists of:

300 grams sodium chloride, 1000 cc.'s water, 80 cc.'s concentrated sulphuric acid.

Figure 2:
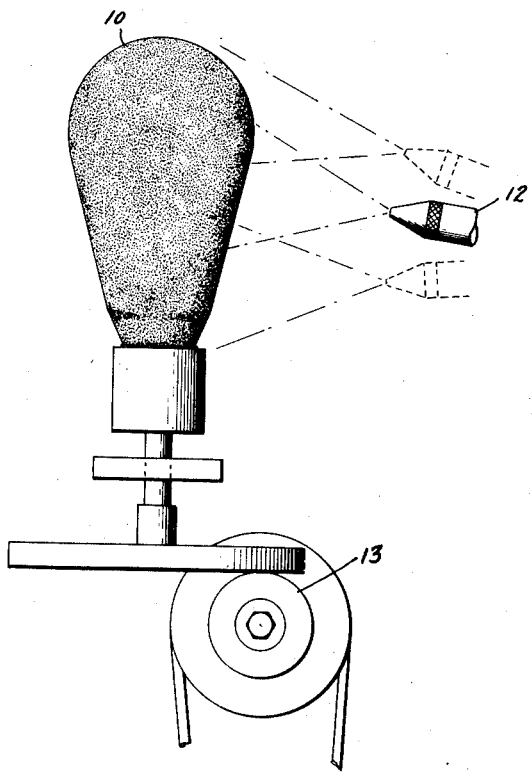

In the accompanying drawing we have shown diagrammatically an apparatus which may be used in the practice of our invention. Figure 1 is a diagrammatical view of such an apparatus in side elevation. Figure 2 is an elevation partly broken away showing the spraying portion of the apparatus.

As shown in the drawing, our invention is applied to the coating of incandescent electric lamps. Such a lamp "10" is mounted in a suitable holder at position "A", said holder being carried on an endless chain "11" which travels in the direction shown by the arrow in Figure 1. At the spraying position "B" the lamp is suitably sprayed while being rotated by means of any suitable spraying device comprising a nozzle "12". The rotation of the lamp during the spraying may be secured in any suitable manner, for instance as shown in Figure 2, by the friction drive "13". After the coating has been applied evenly over the whole lamp or any desired portion thereof, the lamp passes into an oven "14" which is heated in any suitable manner. Preferably the heating is at about 150° C. and takes about two minutes. This thoroughly dries the coating. The fixing solution is applied at position "C". Preferably the fixing solution at 30° to 75° centigrade is contained in a tank "15" which is raised in a suitable manner so as to cause the bulb "10" to be immersed in the fixing solution contained therein. The bulb should be kept in the solution for about ten seconds. About one liter of solution for each one hundred incandescent lamps of the 25 watt size or for smaller lamps should be used. For larger lamps about one liter for each fifty lamps will give good results.

The lamp next passes to position "D" where a rinsing tank "16" containing water is raised so as to allow the lamp to pass through the water. This washes off the surplus fixing solution. At position "E" the lamp is dried by means of a suitable heater "17" and while in this position the lamp may be rotated so as to facilitate the drying. At position "F" the lamps are removed from the carrier.

What we claim as new and desire to secure by Letters Patent of the United States, is:—

1. The process of coating a glass surface which consists in applying thereto a coating comprising a mineral body material intimately mixed with an alkaline silicate binding material, drying the coating thereon, and thereafter subjecting the same to the action of a fixing solution containing a halogen compound.

2. A bulb for an incandescent electric lamp comprising a coating consisting substantially of a filler and precipitated silica.

3. The process of affixing a coating to a siliceous article comprising applying thereto a preparation containing a soluble silicate, drying said applied preparation and applying a second preparation which re-acts with the first preparation.

4. The process of affixing a coating to a glass article which comprises applying thereto a preparation containing a body material mixed with a soluble silicate, drying said preparation and thereafter applying a second preparation which re-acts with the first preparation to precipitate silica therefrom.

5. An electric lamp bulb having a coating comprising an insoluble mineral compound and precipitated silica.

6. An electric lamp bulb having a coating comprising an insoluble silicate and precipitated silica.

In witness whereof, we have hereunto set our hands this 21 day of Feb. 1922.

HAROLD D. BLAKE.
JOSEPH E. STONE.